United States Patent
Afsenius

[19]

[11] Patent Number: 5,886,814

[45] Date of Patent: Mar. 23, 1999

[54] BINOCULAR IMAGE INTENSIFIER VIEWER

[75] Inventor: Sven-Åke Afsenius, Lidingö, Sweden

[73] Assignee: Simrad Optronics A/S, Oslo, Norway

[21] Appl. No.: 956,360

[22] Filed: Oct. 23, 1997

[30] Foreign Application Priority Data

Oct. 24, 1996 [SE] Sweden ................................. 9603895

[51] Int. Cl.[6] ................................................. G02B 23/00
[52] U.S. Cl. .......................... 359/407; 359/399; 359/412
[58] Field of Search .................................. 359/399–420,
359/376–378, 480–482, 618, 629, 630;
250/214 VT; 313/524

[56] References Cited

U.S. PATENT DOCUMENTS

| 4,568,153 | 2/1986 | Baluteau | 313/524 |
| 4,582,400 | 4/1986 | Lough | 313/524 |
| 5,223,974 | 6/1993 | Phillips et al. | 359/407 |
| 5,621,567 | 4/1997 | Quint et al. | 359/407 |
| 5,712,726 | 1/1998 | Espie et al. | 359/407 |

FOREIGN PATENT DOCUMENTS

| 87/00639 | 1/1987 | European Pat. Off. | 359/407 |

Primary Examiner—Thong Nguyen
Attorney, Agent, or Firm—Young & Thompson

[57] ABSTRACT

A folded image intensifier viewer with an asymmetric viewing system and a single image intensifier and two eyepieces able to regulate the mutual distance between the eyepieces, after a beam splitter which divides the beam path into two extremely asymmetric parts, for each eyepiece a lens system is provided with at least one having at least two lenses.

7 Claims, 2 Drawing Sheets

BINOCULAR IMAGE INTENSIFIER VIEWER

BACKGROUND OF THE INVENTION

The invention relates to a folded image intensifier viewer with an asymmetric viewing system and a single image intensifier and two eyepieces able to regulate the mutual distance between the eyepieces, after a beam splitter which divides the beam path into two extremely asymmetric parts.

DESCRIPTION OF THE RELATED ART

An image intensifier viewer, also called goggles, is known from Swedish Patent No. 450 671 (8503533-5). As is evident from this document such nightviewers have great advantages, when it is a question of size and above all through having the center of gravity able to be placed near to the head with a minimal construction in front, which makes such a nightviewer considerably more comfortable to wear than the previously known constructions of this type.

This known construction is shown in FIG. 1 which is taken from said patent document. FIG. 2A shows most of the viewing system with lenses 7 and 8, beam splitter 14, the two split beam parts thereafter, for the left eye mirror 16 and eyepiece 13A, and the for right eye prism 15 and eyepiece 13B. The outgoing beams of rays from the lens 8 are then each focused in an intermediate image in front of the two eyepieces 13A and 13B. It is evident that the mechanical beam for the right eye is longer than that for the left. The optical construction length is, however, very nearly the same for both beam parts, thanks to the optical path being reduced by means of a suitable choice of glass in the prism 15. Also shown is a single image intensifier 2 and an objective 1 for reproducing a scene on the intensifier 2.

This construction is rigid in that it is practically impossible to adjust the distance between the eyepieces to compensate for different distances between the eyes. This problem receives a sort of inadequate solution in the known construction through the egress pupils for the eyepieces being on the generous size so that a large number of users do not experience any great requirement for such an adjustment. The more an observer's distance between the eyes differs from the average distance of 66 mm, the worse, however, becomes the optical performance as the correction is optimized for the center of the egress pupils. Amongst others, the field of view vignette rings increase and the sharpness deteriorates.

However, in many cases for obvious reasons it is an urgent and sometimes imperative requirement, especially from military buyers, that such a possibility of adjustment nevertheless is present. Otherwise the binocular viewer cannot be used by everybody which in certain connections is an unacceptable state of things. The inconvenience of a fixed distance between the eyes consequently increases with reduced eyepiece pupils. Further difficulties therefore occur when one wishes to miniaturize image intensifier viewers, for example by means of smaller eyepieces and therefore reduced egress pupils. Furthermore, there are more often requirements for a larger field of view which often reduces the focal length of the eyepieces, and this is more and more difficult to combine with the large egress pupils which are necessary in order to be able to accept the lateral immovability of the eyepieces.

SUMMARY OF THE INVENTION

According to the invention these problems are eliminated through making one eyepiece movable. The requirements which must in this case be satisfied are partially the same as those for the known construction, viz. that the eyepieces must project equally far from the instrument casing and this also after adjustment of the distance between them, and that the magnification in the two eyepieces therewith must remain mutually equal. The latter presents special difficulty on the grounds that the construction is not symmetrical but in fact the left and right eyepiece systems are completely different, with, amongst others, different optical lengths, a difference which is corrected through using different optical constructions in the respective eyepiece channel, so that their so-called tele effect differs, and this is made possible through each part of the lens after the beam splitter containing a sufficient number of lens elements to achieve such an optical degree of freedom.

The above objects and advantages and others, which are evident from the continued description, are consequently achieved according to the invention through a binocular image intensifier viewer of the type mentioned in the introduction and in the following description of the preferred embodiments.

BRIEF DESCRIPTION OF THE DRAWINGS

The invention will now be described in the form of a non-limiting example of an embodiment and with reference to the Figures.

DESCRIPTION OF THE PREFERRED EMBODIMENTS

Figure 1:
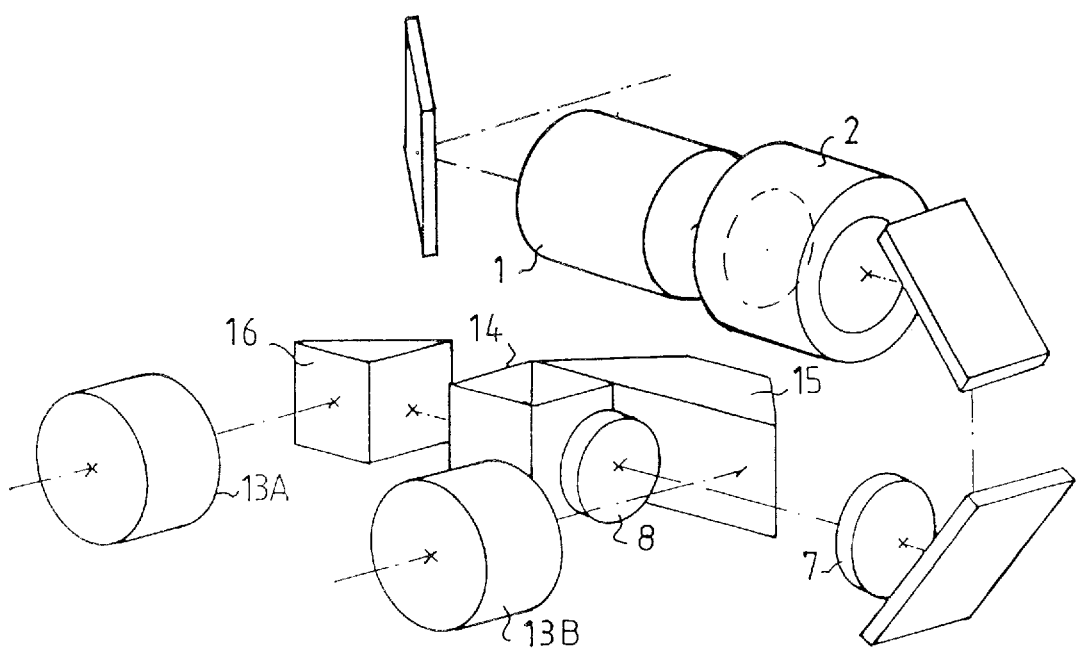
FIG. 1 shows schematically in a perspective view a known binocular image intensifier viewer with a fixed distance between the eyes.
Figure 2A:
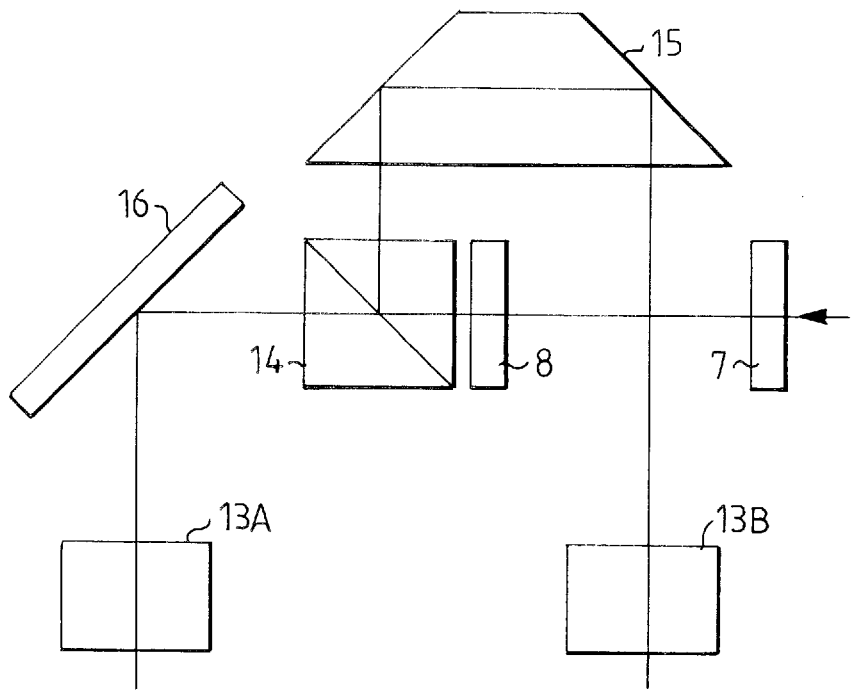
FIG. 2A shows a part of the beam in the same image intensifier viewer but in a schematic plan view.
Figure 2B:
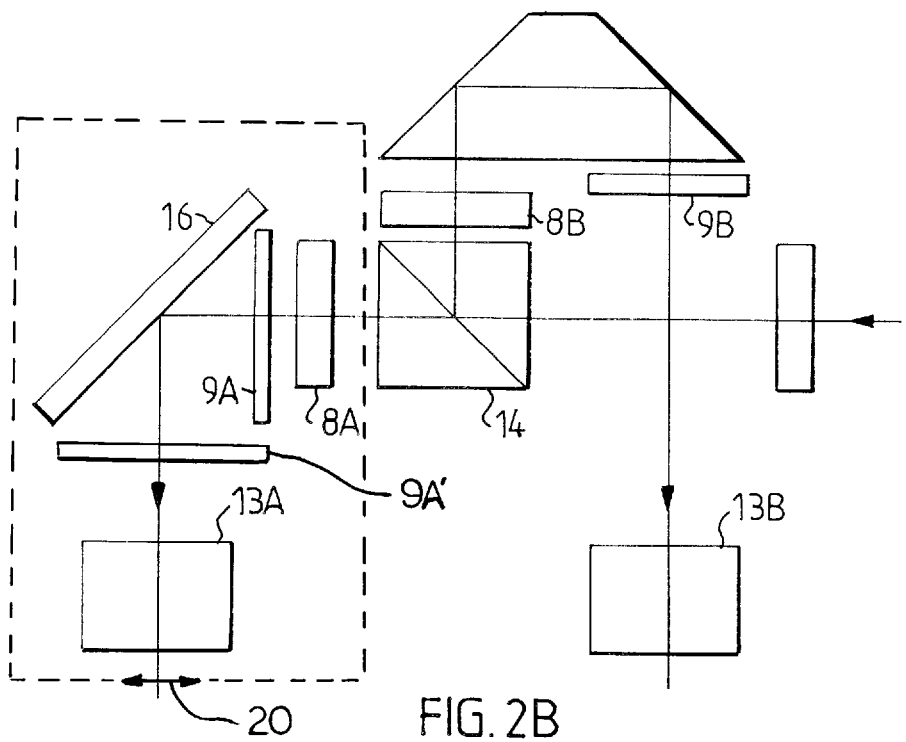
FIG. 2B shows a viewing system according to the invention with a variable eyepiece distance.

FIGS. 1 and 2A have already been described above. FIG. 2B can suitably be compared with FIG. 2A in order to see how the invention differs from that which is already known.

In the known construction in FIG. 2A, lens 7 is a collimation lens which reproduces the output plane of the light intensifier tube at an infinite distance. The lens 8 focuses the collimated beams from the lens 7 towards the respective eyepieces 13A and 13B. As is shown, the geometric/mechanical path for the right beam part is longer than that of the left here. Through choosing types of glass with a suitably high refractive index in the prism 15 the optical path is, however, reduced.

In FIG. 2B the lens 8 in front of the beam splitter 14 has been eliminated. The parallel beams from the lens 7 are instead focused in each beam individually by the lenses 8A and 8B. Instead of a lens 8 refracting for both paths, here in each part consequently an individual lens 8A and 8B have been inserted. This leads to that the collimated light from lens 7 now continues through the beam splitter and onto the lens 8A, permitting the important fact and the effect which is the aim of the invention, that this eyepiece 13A now can move laterally, as indicated by arrow 20, together with the mirror 16 and the lens 8A without causing the eyepiece focusing (13A), i.e. the dioptric adjustment, to need to be adjusted. Through this arrangement, viz. by moving the collimation lens 8 from a position in front of the beam splitter to one after the same, then unfortunately the available optical path through each of the channels is correspondingly shortened. With reference to the already earlier (FIG.

2A) shown certain mutual differences, the percentage differences (FIG. 2B) will therefore be increased.

A particular problem here is that it is mechanically tight; the distance between the eyepieces being defined by the human measurement of 66 mm. Furthermore, there must be sufficient space present for the different parallel beams of rays to be able to pass through the whole lens system without unacceptable vignetting.

In order to solve this problem, according to the invention optical solutions with several lenses are provided, so constructed that the system focal length in the respective eyepiece channels remains the same, even despite the optical and mechanical construction in the two channels being different.

Through a suitable choice of geometric configurations and refractive power distribution in the respective part systems in the beam path from the intensifier tube to the eyepieces, it has been shown to be possible, however, to still fit the system into the available space.

The solution which is suggested according to the example of an embodiment is consequently that the refracting lens 8 is swapped for two refracting lenses 8A,8B, placed after the beam splitter 14A (which can be a mirror or, as illustrated, a prism construction), complemented with each having a lens for correction of magnification and construction length. An example thereof is shown in FIG. 2B. The correction lens 9A is placed between the mirror 16, a reflecting unit, and the collimation lens 8A. Alternatively, a correction lens 9A' may be placed intermediate mirror 16 and eyepiece 13A in lieu of lens 9A. The correction lens 9B is mounted close to the prism 15 at its output side, where it cannot obscure the common beam path between lens 7 and the beam splitter 14. Other positions are possible but it has shown that the aforementioned is advantageous and permits good correction and eyepiece fields of view greater than 50°.

As is known to the person skilled in the art, with the further degree of freedom which is obtained by several lenses, an improved correction of different image errors such as distortion, astigmatism and color errors is made possible. It is true that the phosphorus in the output surface of a light intensifier is green but it is not a pure spectral color and therefore an achromatization is still necessary.

In certain cases it is possible to have only one refracting lens in one part of the beam path wherewith one compensates to an equal magnification by means of the lens elements in the other part of the beam path. However, in general it is preferred to have at least one correction lens in each part of the beam path, as in that case one obtains several degrees of freedom during construction concerning geometry and magnification and naturally the reduction of reproduction errors.

It is clear that the magnification must be the same in the two systems as the wearer otherwise will have problems such as headache and double vision. It is necessary that the pictures also are similar concerning, for example, distortion and field of view bending. The increased degree of freedom concerning the design of the different lenses according to the invention is necessary in order to provide this.

As the skilled person knows, the calculation of the lenses and their positions is performed with the help of commercial computer problems, where one starts from a geometrically suitable configuration which is optimized through successive iterations.

It is normally desired in a binocular nightviewer that it obtains an magnification of 1:1, and this magnification which is achieved by the lens combination in the respective eyepiece branches is in this case dependent on the focal length for the objective which reproduces the night scene on the image intensifier tube's input plane. However, the invention is not limited to this, in itself, generally advantageous unitary magnification as it is also normal that, for example, a so-called teleconverter is placed in front of the objective on these instruments in order to thereby achieve other magnifications.

Unitary magnification can be achieved if the objective 1 and the eyepieces have the same focal length and the optical transport system from the image intensifier's output to the eyepieces has a unitary magnification. Otherwise, for achieving a unitary magnification the following conditions apply:

$$f(oc)=G \cdot f(obj)$$

where f(obj) is the said objective's focal length, f(oc) is the focal length of the eyepiece, and G is the magnification between the intensifier tube's image on the phosphorous screen to the intermediate image in the image plane of the eyepieces.

I claim:
1. A binocular image intensifier viewer comprising:
   two eyepieces (13A, 13B);
   a single image intensifier (2), said image intensifier being orientated perpendicular to an aiming direction and, in relation to a user, parallel with a line which joins the user's eyes;
   an objective (1) for reproducing an image of a scene on said image intensifier;
   an optical viewing system operatively located after said image intensifier which has a main beam path in the same plane as the user's eyes and the main beam path being perpendicular to optical axes of said eyepieces;
   an asymmetric beam path comprising a beam splitter (14) which divides a main beam entering said optical viewing system into a first and a second beam part, the first beam part being reflected by said beam splitter, and the second beam part being formed by beam rays which, without being reflected, pass through said beam splitter;
   said image intensifier and said objective being places in a plane separated from a line uniting the eyes of a user;
   said beam splitter being arranged in a collimated beam path from a first lens (7) which reproduces a picture on an output plane of said light intensifier at an infinite distance;
   special lens means producing said picture on each of said two eyepieces, said special lens means comprising two separate lens means parts, each of said two separate lens means parts being arranged in their own parts of said viewing system and after said beam splitter;
   at least one of said two separate lens means parts comprising at least two lenses; and
   one of said two eyepieces (13A) being in a path of the second beam part,
   wherein said one of said two eyepieces and an associated one of said two separate lens beam parts are designed and adapted to be movably mounted for changing a distance between said two eyepieces.

2. The viewer of claim 1, wherein both lens means parts each comprise two lenses.

3. The viewer of claim 1, further comprising a movable eyepiece unit, said movable eyepiece unit comprising a reflecting unit (16), the lens means part in the path of the second beam part, said last mentioned lens means part comprising a first lens (8A) and a second lens (9A), both said first and second lenses being arranged beam-path-wise before said reflection unit, and said one of two said eyepieces.

4. The viewer of claim 1, wherein the lens means part in the path of the first beam part comprises two lenses (8B, 9B) arranged beam-path-wise each on one side of a reflecting unit (15).

5. The viewer of claim 1, wherein the lens means part in the path of the first beam part comprises two lenses (8B, 9B) arranged beam-path-wise with one of said two lenses being arranged beam-path-wise intermediate said beam splitter and a reflecting unit (15).

6. The viewer of claim 1, further comprising a movable eyepiece unit, said movable eyepiece unit comprising said one of two said eyepieces, a reflecting unit (16), and the lens means part in the path of the second beam part, said last mentioned lens means part comprising a first lens (8A) and a second lens (9A), said first lens being arranged beam-path-wise before said reflecting unit and said second lens being arranged beam-path-wise intermediate said reflecting unit and said one of two said eyepieces.

7. The viewer of claim 1, wherein said viewer has a unitary magnification.

\* \* \* \* \*